United States Patent
Wang et al.

(10) Patent No.: US 11,238,273 B2
(45) Date of Patent: Feb. 1, 2022

(54) DATA PROCESSING METHOD AND APPARATUS, ELECTRONIC DEVICE AND STORAGE MEDIUM

(71) Applicant: BEIJING SENSETIME TECHNOLOGY DEVELOPMENT CO., LTD., Beijing (CN)

(72) Inventors: Min Wang, Beijing (CN); Zhuang Zou, Beijing (CN); Wentao Liu, Beijing (CN); Chen Qian, Beijing (CN); Lizhuang Ma, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/049,687

(22) PCT Filed: Apr. 23, 2019

(86) PCT No.: PCT/CN2019/083959
§ 371 (c)(1),
(2) Date: Oct. 22, 2020

(87) PCT Pub. No.: WO2020/057121
PCT Pub. Date: Mar. 26, 2020

(65) Prior Publication Data
US 2021/0240971 A1 Aug. 5, 2021

(30) Foreign Application Priority Data
Sep. 18, 2018 (CN) .......................... 201811089872.4

(51) Int. Cl.
*G06K 9/00* (2006.01)
*G06T 7/50* (2017.01)
*G06T 7/70* (2017.01)

(52) U.S. Cl.
CPC ..... *G06K 9/00342* (2013.01); *G06K 9/00369* (2013.01); *G06T 7/50* (2017.01); *G06T 7/70* (2017.01); *G06T 2207/30196* (2013.01)

(58) Field of Classification Search
CPC .. G06K 9/00; G06K 9/00342; G06K 9/00369; G06K 9/62; G06K 9/627; G06T 7/50; G06T 7/70; G06T 2207/30196
See application file for complete search history.

(56) References Cited

U.S. PATENT DOCUMENTS

2012/0139907 A1    6/2012    Lee
2013/0083162 A1    4/2013    Wang
(Continued)

FOREIGN PATENT DOCUMENTS

CN    102800126 A    11/2012
CN    103037226 A    4/2013
(Continued)

OTHER PUBLICATIONS

Li et al. "3d human pose estimation from monocular images with deep convolutional neural network." Asian Conference on Computer Vision. Springer, Cham, 2014. (Year: 2014).*

(Continued)

*Primary Examiner* — Katrina R Fujita
(74) *Attorney, Agent, or Firm* — Cooper Legal Group, LLC

(57) ABSTRACT

Provided are a data processing method and apparatus, an electronic device and a storage medium. The data processing method comprises: according to a reference depth value and an actual depth value of a key point of a target in an image, converting first 2D coordinates of the key point into second 2D coordinates, wherein the second 2D coordinates and the
(Continued)

reference depth value constitute a first 3D feature of the key point; and based on the first 3D feature, obtaining a 3D posture of the target.

17 Claims, 5 Drawing Sheets

(56) References Cited

U.S. PATENT DOCUMENTS

| | | | | |
|---|---|---|---|---|
| 2014/0293016 | A1* | 10/2014 | Benhimane | G06T 17/00 348/50 |
| 2015/0063681 | A1* | 3/2015 | Bhardwaj | G06K 9/00208 382/154 |
| 2015/0243038 | A1* | 8/2015 | Zhao | G06T 7/254 382/103 |
| 2016/0034781 | A1* | 2/2016 | Chiaki | G06K 9/6201 382/197 |
| 2018/0184070 | A1* | 6/2018 | Nash | G06T 7/593 |
| 2019/0278983 | A1* | 9/2019 | Iqbal | G06K 9/00355 |
| 2019/0311190 | A1* | 10/2019 | Wang | G06K 9/00389 |

FOREIGN PATENT DOCUMENTS

| | | |
|---|---|---|
| CN | 104243948 A | 12/2014 |
| JP | 2015167008 A | 9/2015 |
| JP | 2017097578 A | 6/2017 |
| WO | 2018087933 A1 | 5/2018 |

OTHER PUBLICATIONS

Moreno-Noguer, Francesc. "3d human pose estimation from a single image via distance matrix regression." Proceedings of the IEEE Conference on Computer Vision and Pattern Recognition. 2017. (Year: 2017).*

Nie et al. "Monocular 3d human pose estimation by predicting depth on joints." 2017 IEEE International Conference on Computer Vision (ICCV). IEEE, 2017. (Year: 2017).*

Simo-Serra, Edgar, et al. "A joint model for 2d and 3d pose estimation from a single image." Proceedings of the IEEE Conference on Computer Vision and Pattern Recognition. 2013. (Year: 2013).*

Tekin et al. "Learning to fuse 2d and 3d image cues for monocular body pose estimation." Proceedings of the IEEE International Conference on Computer Vision. 2017. (Year: 2017).*

Tome et al. "Lifting from the deep: Convolutional 3d pose estimation from a single image." Proceedings of the IEEE Conference on Computer Vision and Pattern Recognition. 2017. (Year: 2017).*

Wang et al. "Drpose3d: Depth ranking in 3d human pose estimation." arXiv preprint arXiv:1805.08973 (May 2018). (Year: 2018).*

Yasin et al. "A dual-source approach for 3d pose estimation from a single image." Proceedings of the IEEE Conference on Computer Vision and Pattern Recognition. 2016. (Year: 2016).*

Iqbal et al. "Hand pose estimation via latent 2.5 d heatmap regression." Proceedings of the European Conference on Computer Vision (ECCV). Apr. 2018. (Year: 2018).*

International Search Report and the English Translation in the international application No. PCT/CN2019/083959, dated Jul. 5, 2020, 5 pages.

Written Opinion and the English Translation of the International Search Authority in the international application No. PCT/CN2019/083959, dated Jul. 5, 2020, 8 pages.

"Camera Calibration and 3D Reconstruction", Jun. 2021, reprinted from the Internet at: https://docs.opencv.org/2.4/modules/calib3d/doc/camera_calibration_and_3d_reconstruction.html, 48 pgs.

"Iterative Estimation of Rotation and Translation Using the Quaternion", December 1009, Mark D. Wheeler and Katsushi Ikeuchi, Carnegie-Mellon University, Department of Computer Science, 17 pgs.

Written Opinion of the Singaporean application No. 11202010510X, dated Jun. 14, 2021, 7 pgs.

First Office Action of the Japanese application No. 2020-558429, dated Jun. 25, 2021, 4 pgs.

Notice of Allowance of the Japanese application No. 2020-558429, dated Nov. 22, 2021, 5 pgs.

* cited by examiner

DATA PROCESSING METHOD AND APPARATUS, ELECTRONIC DEVICE AND STORAGE MEDIUM

CROSS-REFERENCE TO RELATED APPLICATION

This application is based upon and claims priority to Chinese patent application No. 201811089872.4 filed on Sep. 18, 2018, the disclosure of which is hereby incorporated by reference in its entirety.

TECHNICAL FIELD

The application relates, but is not limited, to the field of information technology, and in particular to a data processing method and apparatus, an electronic device and a storage medium.

BACKGROUND

In motion sensing scenarios such as a motion sensing game, a motion sensing device typically needs to be worn by a body. The motion sensing device collects a Three-Dimensional (3D) posture of the body and transmits the 3D posture to a controlled device, thus controlling the controlled device. For control of such controlled device, the motion sensing device is often used.

SUMMARY

In view of this, embodiments of the application are intended to provide a data processing method and apparatus, an electronic device and a storage medium.

The technical solutions of the application are implemented as follows.

A data processing method is provided, which may include the following operations.

First two-dimensional (2D) coordinates of key points are converted into second 2D coordinates according to actual depth values of the key points of a target in an image and reference depth values, the second 2D coordinates and the reference depth values forming first 3D features of the key points.

A 3D posture of the target is obtained based on the first 3D features.

A data processing apparatus is provided, which may include a first conversion module and a first obtaining module.

The first conversion module is configured to convert first 2D coordinates of key points into second 2D coordinates according to reference depth values and actual depth values of key points of a target in an image, the second 2D coordinates and the reference depth values forming first 3D features of the key points.

The first obtaining module is configured to obtain a 3D posture of the target based on the first 3D features.

A computer storage medium is provided, having stored therein computer executable codes; where the computer executable codes, when being executed, enable to implement the data processing method provided by one or more technical solutions.

An electronic device is provided, which may include: a memory, and a processor. The memory is configured to store information. The processor is connected to the memory and configured to execute computer executable instructions stored on the memory to implement the data processing method provided by one or more technical solutions.

According to the technical solutions provided by the embodiments of the application, a 3D image of the target may be collected, where the 3D image includes a 2D image and a depth image, the depth image is used for providing a depth value of a distance between an identification target and a camera, and the 3D image is used for providing a posture of a target such as a Red Green Blue (RGB) or a Luma and Chroma (YUV) in a 2D imaging plane. Therefore, the 3D image may be used to acquire a 3D posture of the target. For example, by processing of the 3D image through a deep learning module such as a neural network, the 3D posture of the target within a 3D space may be extracted. However, during collection of images, the target moves back and forth relative to the camera, such that the depth value in the collected depth image of the camera changes. If the deep learning module can identify 3D postures of targets at different distances, training samples at specific distances are to be used for training on one hand, which has a large training difficulty and a long training cycle; and on the other hand, even though various training samples at specific distances are used for training, the training effect of the deep learning module may not be sufficiently good and thus the extraction precision on 3D postures of 3D images at different distances, that have relatively small samples is still not enough. In the embodiments of the application, before the first 3D features of the key points of the target in the 3D image are input to a depth model, the target is translated in the 2D imaging plane, the actual depth values are converted to the reference depth values, so that the first 3D features of the target at the reference depth values may be obtained; and then the first 3D features are input to the deep learning model for processing. Since the used reference depth value is the depth value used during training of the deep learning module, the 3D posture of the target may be accurately extracted, and both the sample and the time required for the training of the deep learning module are reduced.

DETAILED DESCRIPTION

The technical solutions of the application are further described below in detail in combination with the accompanying drawings and specific embodiments of the specification.

Figure 1A:
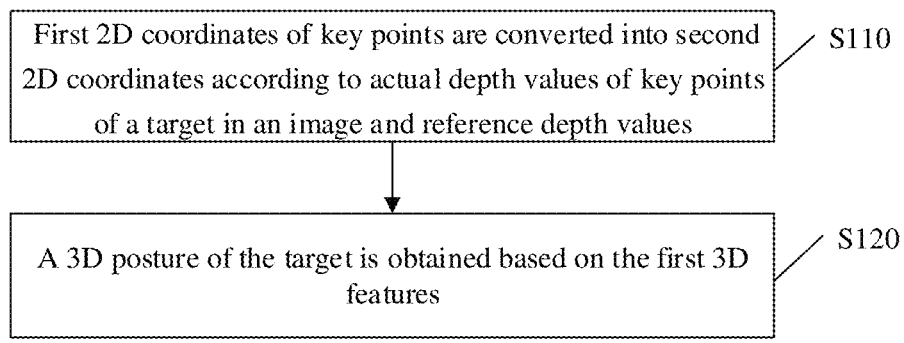
FIG. 1A is a flowchart schematic diagram of a data processing method provided by an embodiment of the application.

As shown in FIG. 1A, an embodiment of the present application provides a data processing method, which may include the following operations.

In S110, first 2D coordinates of the key points are converted into second 2D coordinates according to reference depth values and actual depth values of key points of a target in an image, the second 2D coordinates and the reference depth values forming first 3D features of the key points.

In S120, a 3D posture of the target is obtained based on the first 3D features.

According to the data processing method provided by the embodiment, the data processing method may be applied to one or more electronic devices. The electronic device may include: a processor, which may implement one or more operations in the data processing method through execution of executable instructions such as computer programs. In some embodiments, a single electronic device may perform integrated data processing, and multiple electronic devices may also be used to perform distributive data processing.

The image may be a 3D image. The 3D image includes: a 2D image and a depth image. The 2D image may be an RGB image or a YUV image, etc. The depth image may be depth information collected by use of a depth collection module. The pixel value of the depth information serves as the depth value. The depth value may be a distance from the image collection module to the target. Herein, the actual depth value in the embodiment of the application is related to the depth image.

By conversion from the first 2D coordinate to the second 2D coordinate, after the actual depth value of the target is converted into the reference depth value, the 2D coordinate of the key point of the target in a camera coordinate system is obtained.

In the operation S110, the first 3D features are obtained, through which the deep learning module can accurately extract the 3D posture of the target. The first 3D features are input to the deep learning module, and the depth model automatically outputs the 3D posture of the target. The 3D posture may be represented by relative positions between first 3D features in a 3D space coordinate system.

The first 3D feature herein may include: a coordinate and a reference depth value in an image coordinate system.

For example, a 2D coordinate of a reference point of the target is obtained based on the key point; and the 3D posture may be information representing a posture of a collected object within a 3D space. Specifically, the 3D posture may be represented by a relative position between each of the plurality of key points and the reference point. Supposing that the 2D coordinate of the reference point within the 3D space is (0,0,0) and the target is a human body, then the posture may be obtained by relative positions or relative coordinates of multiple key points representing skeletons of the human body relative to the reference point (0,0,0).

The reference point may be a central point between two ends of the hip of the human body. For example, the key points may be: coordinate points for representing a head, a neck, an elbow, a wrist, a hip, a knee and an ankle. Therefore, according to relative positions of these key points relative to the reference point, translation distances of the current human body that translates to the front, rear, left and right are obtained; an orientation of a face may further be obtained according to a relative position between a key point on the face and the reference point, such that rotation parameters of the human head, such as a rotation amount and/or a rotation direction are obtained; and according to a relative position between a key point on a trunk and the reference point, rotation parameters of the trunk, such as a rotation amount and/or a rotation direction may be determined. The key point on the face may be a point located on the nose, such as a coordinate point of the nasal tip. The key point of the trunk may be a coordinate of a central point on the chest. Certainly, the above are only examples of the key points and the specific implementation is not limited thereto.

Further, if the target is a human body, a number of N+M second 2D coordinates may be obtained according to coordinates of N key points in the operation S110. The additional M second 2D coordinates may be generated according to first 2D coordinates of the N key points. For example, the M may be 1, and the added one second 2D coordinate may be the 2D coordinate corresponding to the reference point of the human body. The N may be 14.

In the operation S120, second 2D coordinates of N+1 key points and reference depth values may be input to a deep learning module, and 3D coordinates of N+S key points may be obtained and output as the 3D posture. The N key points in the N+S key points are in one-to-one correspondence with the N key points of the first 2D coordinates, and the S key points are generated based on the N key points.

For example, concerning the human body, the N first 2D coordinates may be: 14 key points, and the S may be equal to 3, i.e., first 3D features of 17 key points are obtained finally. In some embodiments, one of the 17 key points serves as the reference point. The reference point may be a central point of two ends (corresponding to two key points) of the hip of the human body. The remaining two key points may be the coordinate of the nasal tip on the face and the coordinate of the central point of the chest. Certainly, here is only the example, and the specific implementation is not limited thereto.

Figure 3:
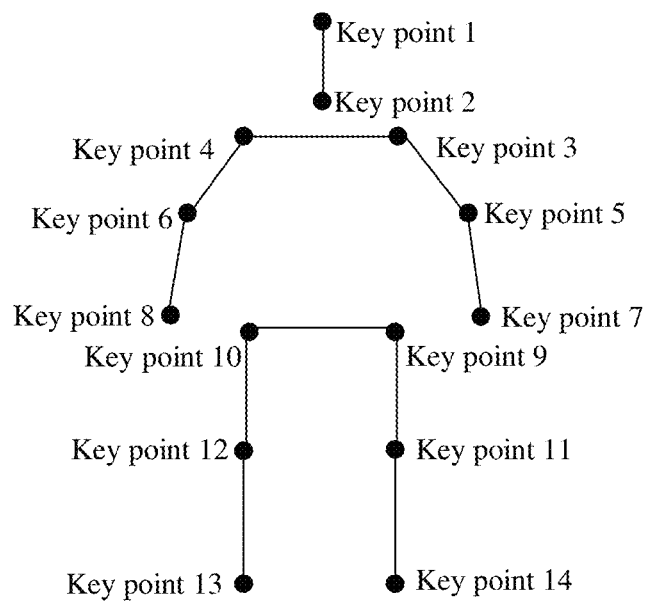
FIG. 3 is a schematic diagram of key points provided by an embodiment of the application.
Figure 6A:
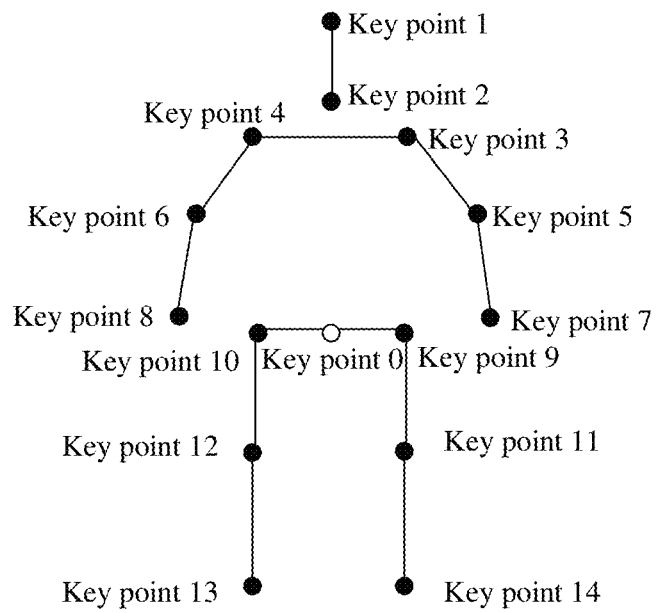
FIG. 6A is a schematic diagram of key points and a reference point provided by an embodiment of the application.
Figure 6B:
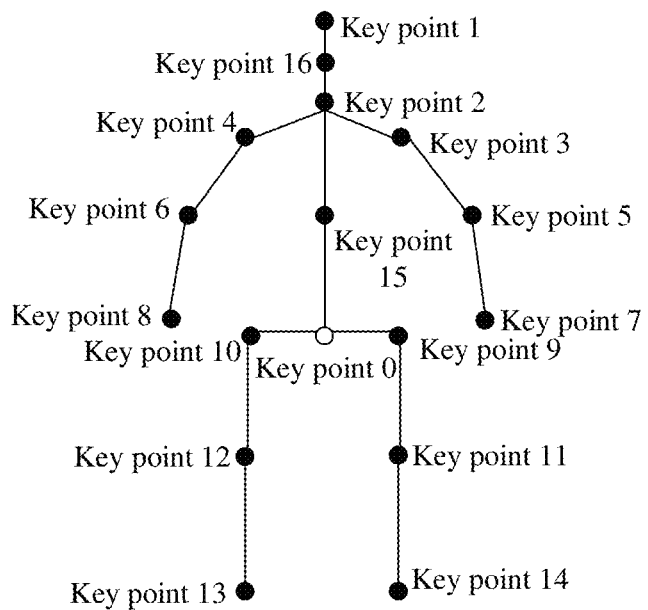
FIG. 6B is another schematic diagram of key points provided by an embodiment of the application.

FIG. 6A may be a schematic diagram illustrating that a key point 0 is added relative to 14 key points in FIG. 3. FIG. 6B may be a schematic diagram illustrating that 17 key points are generated based on 14 key points in FIG. 3. For the 17 key points in FIG. 6B, a key point 0, a key point 15 and a key point 16 are added relative to the key points in FIG. 3. The 2D coordinate of the key point 16 may be preliminarily determined based on the 2D coordinates of the key point 1 and the key point 2, and the 2D coordinate of the key point 15 may be determined according to the 2D coordinate of the key point 2 and the 2D coordinate of the key point 0. The key point 0 may serve as the reference point provided in the embodiment of the application.

In the embodiment of the application, on one hand, during training of the deep learning module such as the neural network, in order that 3D postures of the target in different actual depths can be directly detected, training samples having different actual depth values would be used to train the neural network. In such a case, more training samples are need for training of the neural network, under which the convergence speed of the deep learning module such as the neural network is slower, resulting in a long training cycle. If the method in the embodiment is used, the deep learning module such as the neural network may be trained only by using training samples having the same depth value, such that the data amount of the training samples is small, and thus the convergence speed of the deep learning module such as the neural network is fast and the training cycle is short, etc. Therefore, the deep learning module such as the neural network may be simplified.

On the other hand, if a single depth value (i.e., the reference depth value) is used, the deep learning module (e.g., the neural network) does not sacrifice the extraction accuracy on the 3D posture of the 3D coordinate corresponding to the single depth value due to the different depth values, and thus the high extraction accuracy for the 3D posture is achieved.

For the deep learning module of the first 3D features, in some embodiments, operation S110 may include that: the second 2D coordinates are obtained according to the first 2D coordinates and a ratio of the actual depth values to the reference depth values.

Further, for example, the operation S110 may include that: the second 2D coordinate is determined by using a following functional relationship:

$$X2=(X1*d)/D$$

$$Y2=(Y1*d)/D$$

Where, the X2 is a coordinate value of a second 2D coordinate in a first direction, and the X1 is a coordinate value of the first 2D coordinate in the first direction.

The Y2 is a coordinate value of the second 2D coordinate in a second direction, and the Y1 is a coordinate value of the first 2D coordinate in the second direction, the second direction being perpendicular to the first direction.

The d is an actual depth value, and the D is a reference depth value.

The D may be a spatial distance with a unit of millimeter, centimeter or decimeter, etc.

Figure 2:
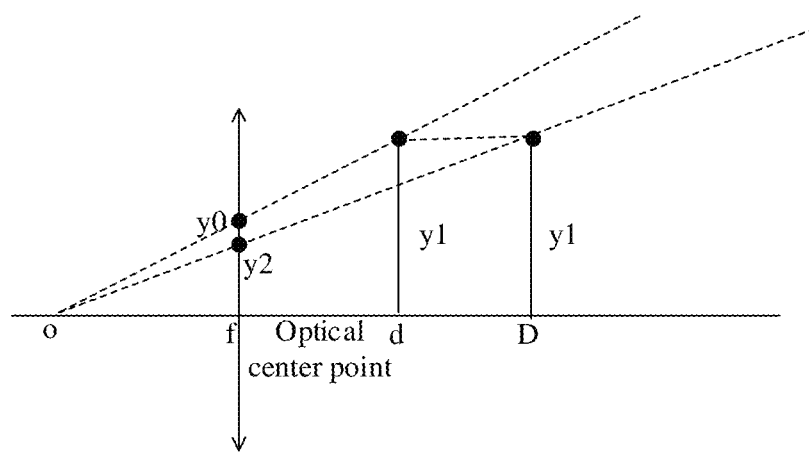
FIG. 2 is a conversion schematic diagram illustrating that a first 2D coordinate is converted into a second 2D coordinate provided by an embodiment of the application.

Referring to FIG. 2, 'of' is a focal length for collecting the image (which may be abbreviated as f), and may be obtained by querying camera parameters; and a second 2D coordinate and a reference depth value may be obtained through transformation of trigonometric functions. The second 2D coordinate and the reference depth value form the first 3D feature. The first 3D feature of a standard depth value is input to the deep learning module, and the target 3D posture can be accurately extracted. Therefore, in some embodiments, the distance denoted by the 'od' is the actual depth value and is abbreviated as the d; and the distance denoted by the 'oD' is the reference depth value. According to the trigonometric function relationship, y0/y1=f/d, and y2/y1=f/D, where y0 denotes a first 2D coordinate, and the y2 denotes a second 2D coordinate. Therefore, y2=(d*y0)/D.

Figure 1B:
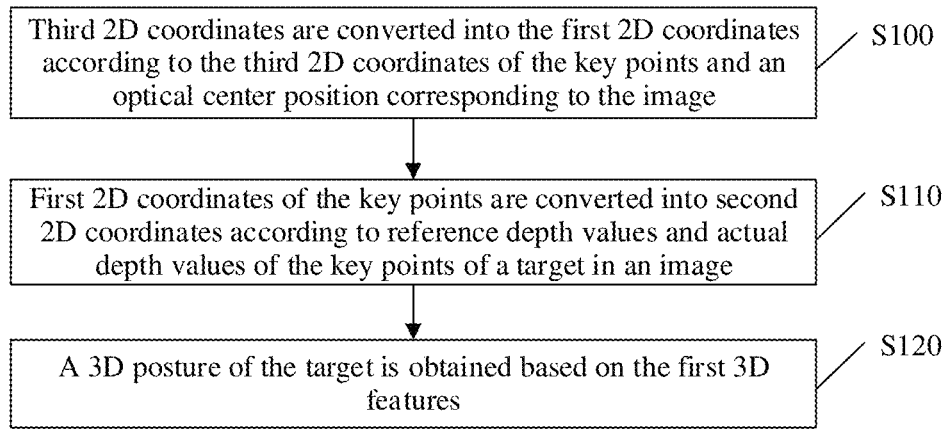
FIG. 1B is a flowchart schematic diagram of a data processing method provided by an embodiment of the application.

In the embodiment, according to the 2D coordinate of the key point in the collected image, a 2D coordinate of an actually collected image in the embodiment is called a third 2D coordinate. As shown in FIG. 1B, the method may further include the following operation.

In S100, the first 2D coordinate is obtained according to a second 3D feature of the key point and an optical center position corresponding to the image.

For example, key points of a target body on the actually collected 2D image may be key points on the body skeleton.

Multiple key points may be provided. For example, if the target is the human body, the key points may include: 14, 2D key points. Herein, the third 2D coordinate may be obtained by processing the 2D image though the deep learning module of the 2D image.

FIG. 3 illustrates 2D coordinates of key points corresponding to the skeleton of the human body. In FIG. 3, 14 key points is represented by 14 black dots.

In some embodiments, the 2D image may be processed by use of the deep learning module to obtain the third 2D coordinates. The third 2D coordinates and actual depth values extracted from a depth image may form second 3D features.

When the 3D posture of the target is estimated based on first 3D features of the target by using the deep learning module, the current target may be at different distances from the image collection module; and if the deep learning module lacks of corresponding training samples previously, the 3D posture of the target cannot be pre-estimated accurately. However, if one deep learning module needs to accurately extract the 3D posture of the target in the 3D image at different distances as much as possible, it is necessary to introduce more training samples to process the deep learning module. As a result, training of the deep learning module is difficult and the training cycle is long. The deep learning module may be various neural networks, and may, for example, include a network having 3D posture identification, such as a fully-connected network as well as a residual module of a residual network. Hence, in embodiment, in order to improve the accuracy of the 3D posture of the target, the depth value in the first 3D feature of the key point of the target is converted into the reference depth value.

For the sake of successfully converting the depth value in the first 3D feature of the key point into the reference depth value, the third 2D coordinate is firstly to be converted into the first 2D coordinate, such that the converted 2D coordinate is located on an optical axis of the image.

Figure 4:
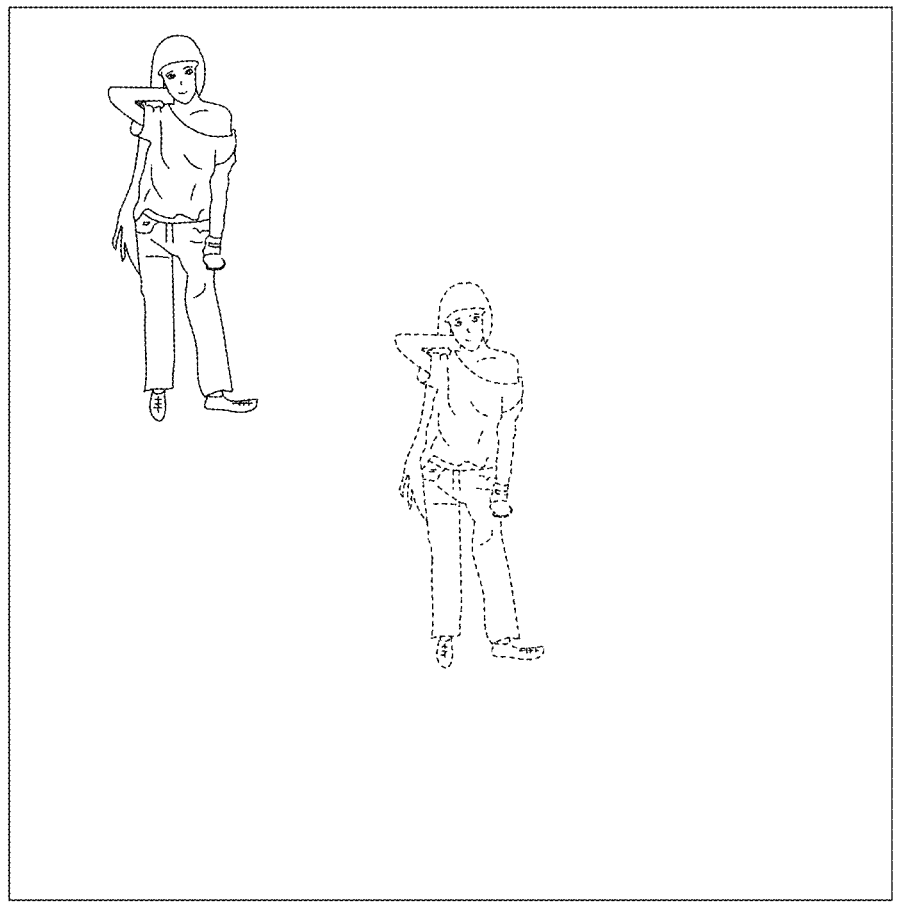
FIG. 4 is a schematic diagram of a translation effect of a target in a 2D image provided by an embodiment of the application.

FIG. 4 illustrates a 2D image. The photographed person is originally located at a non-central position in the photo; and by means of coordinate translation based on the optical central position, the person represented by the solid line in FIG. 4 may be moved from a position where the third 2D coordinate is located to a position where the first 2D coordinate represented by the dotted line is located. By translating of a reference point in the key points on a camera plane, the reference point is moved to the optical axis of the camera plane, which reduces the interference compared with a manner that the third 2D coordinate is directly input to the deep learning module, and the accuracy of the 3D posture is improved; and at the meantime, the data and/or duration required for training of the deep learning module that extracts the 3D posture is reduced, such that the training of the deep learning module is further simplified and the training rate is improved.

Multiple manners are provided to convert the third 2D coordinate into the first 2D coordinate, and one optional manner is provided as follows.

Figure 5:
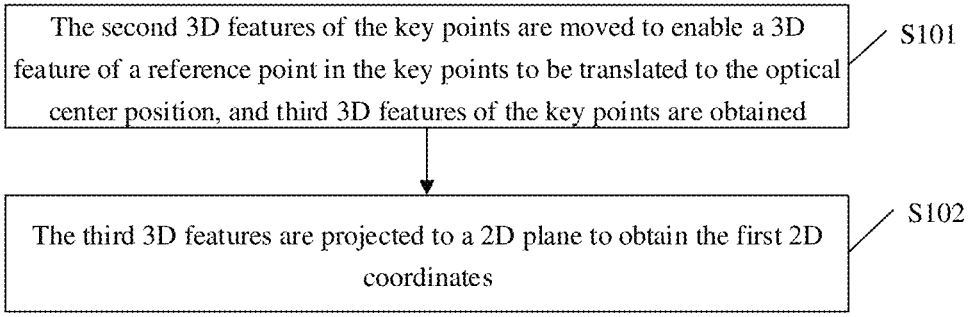
FIG. 5 is a schematic diagram for obtaining first 2D coordinates of key points provided by an embodiment of the application.

As shown in FIG. 5, the operation S100 may include the following operations.

In S101, second 3D features of the key points are moved to enable a 3D feature of the reference point in the key points is translated to the optical center position, and the third 3D features of the key points are obtained.

In S102, the third 3D features are projected to a 2D imaging plane to obtain first 2D coordinates.

In the embodiment, if the second 3D features of the key points in the deep learning module (e.g., the neutral network) in the 3D image excludes the second 3D feature of the reference point, the 2D coordinate of the reference point may be obtained based on third 2D coordinates of other key points; the depth image is searched based on the 2D coordinate of the reference point to obtain an actual depth value at a corresponding position of the reference point; and the second 3D feature of the reference point is obtained. Thereafter, all key points are moved overall in the operation 100, such that, during the movement, the first 3D feature of the reference point is moved to the optical center position, for example, at the optical center position (0,0,0). According to a motion vector that the second 3D feature of the reference point moves to the optical center position, second 3D features of other key points as well as a third 3D feature of the reference point after being moved at the same motion vector may be derived.

After the third 3D features of all key points are obtained, the third 3D features may be projected to the 2D imaging plane to obtain the first 2D coordinates as described above.

With the movement of the second 3D coordinate, at least the reference point of the target moves to the optical axis of the camera coordinate system of the image. The extraction accuracy of the deep learning module such as the neural network for the 3D posture of the target located on the optical axis is higher, such that the phenomenon of an error due to the fact that the reference point of the target is not located on the optical axis is reduced, and the accuracy of the 3D posture is improved. In some other embodiments, if the target is the body skeleton, the first 3D feature of the reference point is determined based on second 3D features of two crotch key points in the key points.

As shown in FIG. 6B, the 2D coordinate of a reference point for the two key points may be calculated according to third 2D coordinates of the key point 9 and the key point 10. The coordinate at this point is the 2D coordinate of the reference point.

In some embodiments, the 2D coordinate of the reference point may be called a 2D coordinate of a root node.

In some embodiments, the reference point may be a reference point of the target or a point close to a central position. In the embodiment, for the human body, a reference point for the two crotch key points is used as the 2D coordinate of the reference point, which is suitable for the specific structure of the human body.

In some embodiments, according to the method, the operation that the 3D posture of the target is obtained based on the first 3D features may include that: a depth value of the reference point is subtracted from depth values corresponding to the second 2D coordinates of the key points to obtain fourth 2D coordinates and depth values corresponding to the fourth 2D coordinates;

normalization processing is performed on the fourth 2D coordinates and the depth values corresponding to the fourth 2D coordinates to obtain normalized fourth 2D coordinates and depth values corresponding to the normalized fourth 2D coordinates; and the normalized fourth 2D coordinates and the depth values corresponding to the normalized fourth 2D coordinates are processed by using a deep learning module to obtain the 3D posture of the target.

For example, the normalized fourth 2D coordinates and the corresponding depth values thereof are respectively input to the neural network; the neural network may directly output the 3D posture; or, the neural network may output a fourth 3D feature that is able to solve the 3D posture; and the 3D posture may be obtained based on the conversion of the fourth 3D feature.

In the embodiment, by means of the normalization processing, the difference caused by collection through cameras having different camera parameters may be eliminated. Therefore, the problem of low accuracy of extraction on the 3D posture of the deep learning module such as the neural network caused by the different camera parameters is eliminated, and the extraction accuracy of the 3D posture of the target may further be improved.

In some embodiments, the operation that the normalization processing is performed on the fourth 2D coordinates and the depth values corresponding to the fourth 2D coordinates to obtain the normalized fourth 2D coordinates and the depth values corresponding to the normalized fourth 2D coordinates may include the following operations.

Coordinate mean values and variances of the key points are obtained based on the fourth 2D coordinates and the depth values corresponding to the fourth 2D coordinates.

The normalized fourth 2D coordinates are obtained according to the coordinate mean values and the variances as well as the fourth 2D coordinates and the depth values corresponding to the fourth 2D coordinates.

Specifically, the mean value is represented by 'Mean', the variance is represented by 'Std', and for one key point, the fourth 2D coordinate may be calculated by using the following functional relationship:

$$X4'=(X4-\text{Mean})/\text{Std}x$$

$$Y4'=(Y4-\text{Mean})/\text{Std}y$$

The X4 is a coordinate value of the fourth 2D coordinate in a first direction, the Y4 is a coordinate value of the fourth 2D coordinate in a second direction, the X4' is a coordinate value of the normalized fourth 2D coordinate in the first direction, the Y4' is a coordinate value of the normalized fourth 2D coordinate in the second direction, the Stdx is a variance of the coordinate value in the first direction; and the Stdy is a variance of the coordinate value in the first direction.

In some embodiments, the method may further include the following operations.

An iterative operation of projecting the 3D posture to a 2D plane is performed based on the actual depth values, so as to obtain a fifth 2D coordinate having a minimum distance with a third 2D coordinate.

According to the fifth 2D coordinate and the first 3D feature, a rotation parameter and a translation parameter of the target are obtained.

In the embodiment, projecting the 3D posture to the 2D plane may include that: the first 3D feature representing the 3D posture is projected to the 2D imaging plane to obtain a 2D projection image in the 2D imaging plane.

Multiple projection manners are provided, and two optional manners are provided hereinafter.

Optional manner 1: a 2D coordinate projected to the 2D imaging plane is obtained according to the 3D posture and a projection matrix. For example, the 3D posture is left multiplied with the projection matrix to obtain a coordinate projected to the 2D imaging plane. The projection matrix herein may be determined according to the camera parameters and/or a projected empirical value.

Optional manner 2: a projection model capable of projecting the 3D posture to the 2D imaging, for example, a projection neural network plane may be used, where the 3D posture serves as an input and the 2D coordinate projected to the 2D imaging plane serves as an output.

After obtaining the output 2D coordinate projected to the 2D imaging plane (i.e., the fifth 2D coordinate), a distance between the output 2D coordinate and the third 2D coordinate may be calculated; and a group of coordinates having a minimum distance is selected to calculate the rotation parameter and the translation parameter. To sum up, during projection, the depth value is removed and only the 2D coordinate in the 2D imaging plane is remained. However, in the embodiment, the 3D posture is actually calculated based on the reference depth value, and in such a case, the 3D posture may be translated back to the position at the actual depth value by using the trigonometric functional relationship shown in FIG. 2. In consideration of the processing error of the deep learning module and the processing error of the camera, the 3D posture may be projected to the 2D imaging plane based on the actual depth value and an approximate value thereof. During projection, it is necessary to minimize the distance between the 2D coordinate projected to the 2D plane and the actual third 2D coordinate. For example, the minimum value between the fifth 2D coordinate and the third 2D coordinate may be represented by the following function: $\min\{(X5-X3)^2+(Y5-Y3)^2\}$.

The (X5, Y5) is the fifth 2D coordinate, and the (X3, Y3) is the third 2D coordinate.

Then, the rotation parameter R and the translation parameter T may be derived by using the following functional relationship:

$$\arg\min_{R,T} K[R\mid T]\cdot S_3 - S_2.$$

The $S_3$ denotes the first 3D feature of a key point, and the $S_2$ denotes the 2D coordinate of the key point.

As the actual depth value provides a depth range for iterative computation, for example, the actual depth value plus an offset to obtain a maximum value of the depth range, and the actual depth value is subtracted by an offset to obtain a minimum value of the depth range, when the 3D posture is projected to the 2D projection plane, the actual depth value may be selected in the depth range. The depth range is selected based on the actual depth value for considering the following reasons that: the depth image collected by the depth camera may be biased on one hand; and errors may occur in the network on the other hand. In view of the above two aspects, the fault-tolerance processing is performed through the depth range, such that the 3D posture is projected to the 2D imaging plane to obtain the optimal fifth 2D coordinate, thereby estimating the rotation parameter and/or the translation parameter.

The translation parameter may represent a translation state of the target, and the rotation parameter may represent a rotation state of the target. The translation parameter may include a translation displacement in each direction, and the rotation parameter may include a rotation displacement in each direction.

In the embodiment of the application, since the actual depth value is known in advance during iteration, the 3D posture may be projected to the 2D plane with the actual depth value as the reference depth value in the depth range including the actual depth value. Compared with the iterative computation in a condition where no actual depth value provides the depth range, the number of iterations is greatly reduced, the computed amount is saved, and the computation rate is improved.

Figure 7:
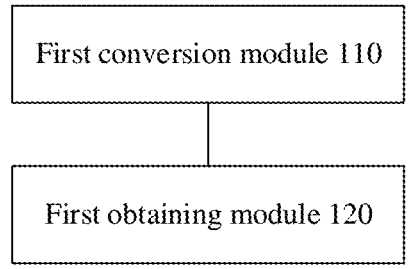
FIG. 7 is a structural schematic diagram of a data processing apparatus provided by an embodiment of the application.

As shown in FIG. 7, the embodiment provides a data processing apparatus, which may include: a first conversion module 110 and a first obtaining module 120.

The first conversion module 110 is configured to convert, according to reference depth values and actual depth values of key points of a target in an image, first 2D coordinates of the key points into second 2D coordinates, the second 2D coordinates and each of the reference depth values forming first 3D features of the key points.

The first obtaining module 120 is configured to obtain a 3D posture of the target based on the first 3D features.

In some embodiments, the first conversion module 110 and the first obtaining module 120 may be program modules. The program modules can implement, after being executed by a processor, the conversion from the first 2D coordinate to the second 2D coordinate and obtaining of the 3D posture.

In some other embodiments, the first conversion module 110 and the first obtaining module 120 may further be a combination of a hardware module and a program module, such as a complex programmable array or a field programmable array.

In some further embodiments, the first conversion module 110 and the first obtaining module 120 may correspond to a hardware module, for example, the first conversion module 110 and the first obtaining module 120 may be Application-Specific Integrated Circuits (ASICs).

In some embodiments, the first conversion module 110 is configured to obtain the second 2D coordinates according to the first 2D coordinates and a ratio of the actual depth values to the reference depth values.

In some embodiments, the first conversion module 110 is configured to determine the second 2D coordinates by using the following functional relationship:

$$X2=(X1*d)/D$$

$$Y2=(Y1*d)/D$$

Where, the X2 is a coordinate value of a second 2D coordinate in a first direction, and the X1 is a coordinate value of a first 2D coordinate in the first direction.

The Y2 is a coordinate value of the second 2D coordinate in a second direction, and the Y1 is a coordinate value of the first 2D coordinate in the second direction, the second direction being perpendicular to the first direction.

The d is an actual depth value, and the D is a reference depth value.

In some embodiments, the apparatus may further include a second conversion module.

The second conversion module is configured to obtain the first 2D coordinates according to second 3D features of the key points and an optical center position corresponding to the image. The second 3D features includes: third 2D coordinates obtained based on a 2D image and actual depth values obtained based on a depth image.

In some embodiments, the second conversion module is configured to move the second 3D features of the key points, such that a 3D feature of a reference point in the key points is translated to the optical center position, and obtain third 3D features of the key points; and project the third 3D features to a 2D imaging plane to obtain an optical center position of the first 2D coordinates.

In some embodiments, if the target is human skeleton, the first 3D feature of the reference point is determined based on second 3D features of two crotch key points in the key points.

In some embodiments, the first obtaining module is configured to subtract a depth value of the reference point from depth values corresponding to the second 2D coordinates of the key points to obtain fourth 2D coordinates and depth values corresponding to the fourth 2D coordinates; perform normalization processing on the fourth 2D coordinates and the depth values corresponding to the fourth 2D coordinates to obtain normalized fourth 2D coordinates and depth values corresponding to the normalized fourth 2D coordinates; and process the normalized fourth 2D coordinates and the depth values corresponding to the normalized fourth 2D coordinates by using a deep learning module to obtain the 3D posture of the target.

In some embodiments, the first obtaining module 120 is configured to obtain, based on the fourth 2D coordinates and the depth values corresponding to the fourth 2D coordinates, coordinate mean values and variances of the key points; and obtain the normalized fourth 2D coordinates according to the coordinate mean values and the variances as well as the fourth 2D coordinates and the depth values corresponding to the fourth 2D coordinates.

In some embodiments, the apparatus may further include: an iteration module and a second obtaining module.

The iteration module is configured to perform, based on the actual depth values, an iterative operation of projecting the 3D posture to a 2D plane to obtain fifth 2D coordinates having a minimum distance with the third 2D coordinates.

The second obtaining module is configured to obtain, according to the fifth 2D coordinate and the first 3D feature, a rotation parameter and a translation parameter of the target.

Figure 8:
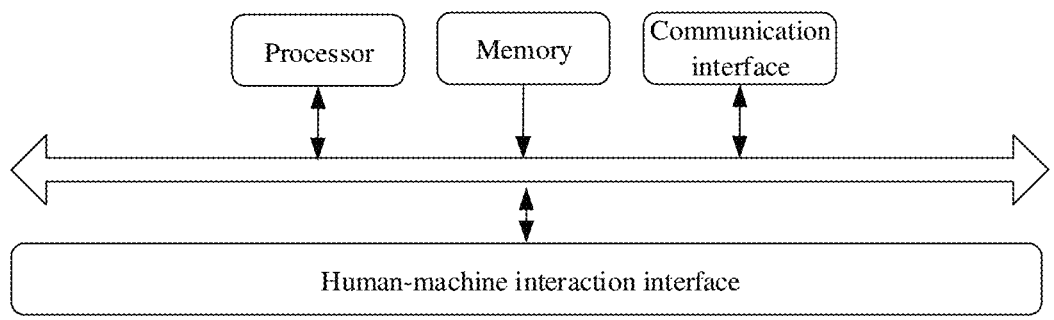
FIG. 8 is a structural schematic diagram of an electronic device provided by an embodiment of the application.

As shown in FIG. 8, the embodiment of the application provides an electronic device, which may include a memory and a processor.

The memory is configured to store information.

The processor is connected to the memory and configured to implement, by executing computer executable instructions stored on the memory, the data processing method provided by one or more technical solutions, such as one or more of the methods shown in FIG. 1A, FIG. 1B and FIG. 5.

The memory may be various types of memories, and may be a Random Access Memory (RAM), a Read-Only Memory (ROM) and a flash memory, etc. The memory may be configured to store the information, for example, store the computer executable instructions, etc. The computer executable instructions may be various program instructions, such as a target program instruction and/or a source program instruction.

The processor may be various types of processors, such as a central processor, a microprocessor, a digital signal processor, a programmable array, a digital signal processor, an ASIC or an image processor.

The processor may be connected to the memory through a bus. The bus may be an integrated circuit bus, etc.

In some embodiments, the terminal device may further include a communication interface; and the communication interface may include: a network interface such as a local area network interface, a transceiving antenna, etc. The communication interface is also connected to the processor and can be configured to receive and transmit the information.

In some embodiments, the terminal device may further include a human-machine interaction interface. For example, the human-machine interaction interface may include various input/output devices, such as a keyboard, and a touch screen.

An embodiment of the application provides a computer storage medium, having stored therein computer executable codes that, after being executed, enable to implement the data processing method provided by one or more technical solutions, such as one or more of the methods shown in FIG. 1A, FIG. 1B and FIG. 5.

The storage medium includes various media capable of storing the program codes such as a mobile storage device, an ROM, an RAM, a magnetic disk or an optical disc. The storage medium may be a non-transient storage medium.

An embodiment of the application provides a computer program product, which includes computer executable instructions that, after being executed, enable to implement the data processing method provided by any of the above embodiments, such as one or more of the methods shown in FIG. 1A, FIG. 1B and FIG. 5.

Several specific examples are provided below in combination with the above embodiments.

Example 1

In the example, a deep neural network is used to predict 2D and 3D key points of a human body and then a 3D vision algorithm is adopted to calculate a 3D posture of the human body, which may specifically include the following operations.

2D positions of 14 key points of the human body in a 2D image are estimated by using a 2D body key point estimation tool.

Actual depth values of the 14 key points of the body are extracted in a depth image corresponding to the 2D image.

2D coordinates corresponding to the actual depth values are converted into 2D coordinates corresponding to reference depth values through a manner such as a trigonometric function.

Normalization operation is performed on the converted 2D coordinates of all key points by using camera intrinsic parameters.

A mean value and a standard deviation of each of the key points are counted after the normalization for a further coordinate normalization operation, to obtain normalized 2D coordinates and reference depth values.

The normalized 2D coordinates and the reference depth values are input to the deep neural network, such that first 3D features of 3D key points are obtained from the 2D key points through the neural network. Based on the first 3D features, the 3D posture may be obtained by using the 3D vision algorithm, etc. For example, the first 3D features are optimized based on Perspective-n-Point (PnP) to obtain the 3D posture.

Figure 9:
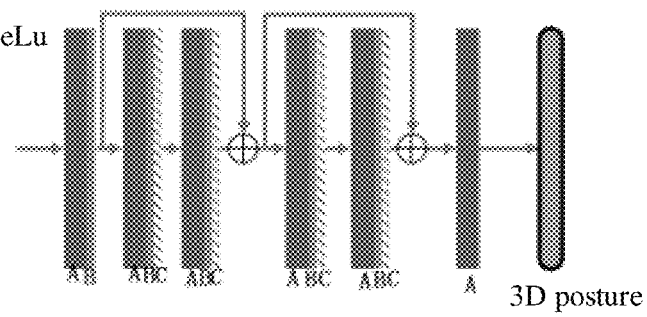
FIG. 9 is a network schematic diagram of a neural network provided by an embodiment of the application.

FIG. 9 illustrates a neural network for obtaining a 3D posture provided by the example, which includes:
a fully-connected layer (Fc), a batching+ReLu layer and a Dropout layer.

The fully-connected layer obtains a first 3D feature of 14 key points and outputs a 3D posture.

The neural network may be configured to extract the 3D posture.

Example 2

The example provides data processing method, which may include the following operations.

A number of 2D body key points (corresponding to 2D coordinates) of an input 2D image are obtained by using a deep neural network.

The 2D body key points are normalized by camera intrinsic parameters and input to a second deep neural network, to obtain relative 3D key points relative to some key points (generally the pelvis) of the human body.

At last, the obtained 2D key points and 3D key points are aligned to derive a 3D spatial posture of the human body by using a PnP algorithm.

Example 3

For each frame of 3D image, coordinates of 14 key points on the image are obtained by using a key point detection tool of a 2D human body.

A 3D body skeleton (17 key points, in which the key point of the pelvis is fixed at 0) is obtained by using an extraction network for the 3D key points with the coordinates of the 2D key points obtained in the first step as an input.

The obtained two body key point models are aligned, such that each of the key points is physically consistent.

In a case where an intrinsic parameter K of a current device is known, external parameters R and T of a target body in a camera coordinate system are calculated, where $$K = \begin{pmatrix} f_x & 0 & c_x \\ 0 & f_y & c_y \\ 0 & 0 & 1 \end{pmatrix}.$$

The $f_x$, $f_y$, $c_x$, $c_y$ may be obtained by calibrating the current device with a Zhang Zhengyou calibration method. Supposing that the aligned 2D body skeleton is $S_2$ and the 3D body skeleton is $S_3$, the following formula may be optimized.

$$\arg\min_{R,T} K[R \mid T] \cdot S_3 - S_2.$$

As a period of continuous video is used as an input, both the R and T in the previous frame may be used to serve as initial values of the next frame. In the several embodiments provided in the disclosure, it should be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some features may be neglected or not executed. In addition, coupling or direct coupling or communication connection between various displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected according to a practical requirement to achieve the purposes of the solutions of the embodiments.

In addition, various function units in various embodiments of the disclosure may be integrated into a processing module, various units may also exist independently, and two or more than two units may also be integrated into one unit. The integrated unit may be implemented in a hardware form, and may also be implemented in form of hardware and software function unit.

Those of ordinary skill in the art should know that: all or part of the operations of the abovementioned method embodiment may be implemented by instructing related hardware through a program, the abovementioned program may be stored in a computer-readable storage medium, and the program is executed to implement the operations of the abovementioned method embodiment; and the storage medium includes: various media capable of storing program codes such as mobile storage equipment, a Read-Only Memory (ROM), a Random Access Memory (RAM), a magnetic disk or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A data processing method, comprising:
converting, according to actual depth values of key points of a target in an image and reference depth values, first two-dimensional (2D) coordinates of the key points into second 2D coordinates, wherein the second 2D coordinates and the reference depth values form first three-dimensional (3D) features of the key points; and
obtaining, based on the first 3D features, a 3D posture of the target,
wherein the method further comprises:
obtaining the first 2D coordinates according to second 3D features of the key points and an optical center position corresponding to the image, the second 3D features comprising: third 2D coordinates obtained based on a 2D image and actual depth values obtained based on a depth image.

2. The method of claim 1, wherein
converting, according to the actual depth values of the key points of the target in the image and the reference depth values, the first 2D coordinates of the key points into the second 2D coordinates comprises:
obtaining the second 2D coordinates according to the first 2D coordinates and ratios of the actual depth values to the reference depth values.

3. The method of claim 2, wherein
obtaining the second 2D coordinates according to the first 2D coordinates and the ratios of the actual depth values to the reference depth values comprises:
determining the second 2D coordinates by using the following functional relationship:

$$X2=(X1*d)/D$$

$$Y2=(Y1*d)/D$$

where, X2 is a coordinate value of a second 2D coordinate in a first direction, and X1 is a coordinate value of a first 2D coordinate in the first direction;
Y2 is a coordinate value of the second 2D coordinate in a second direction, and Y1 is a coordinate value of the first 2D coordinate in the second direction, the second direction being perpendicular to the first direction; and
d is an actual depth value, and D is a reference depth value.

4. The method of claim 1, wherein
obtaining the first 2D coordinates according to the second 3D features of the key points and the optical center position corresponding to the image comprises:
moving the second 3D features of the key points, such that a 3D feature of a reference point in the key points is translated to the optical center position to obtain third 3D features of the key points; and projecting the third 3D features to a 2D imaging plane to obtain the first 2D coordinates.

5. The method of claim 4, wherein
if the target is a body skeleton, the 3D feature of the reference point is determined based on second 3D features of two crotch key points in the key points.

6. The method of claim 4, wherein obtaining, based on the first 3D features, the 3D posture of the target comprises:
subtracting a depth value of the reference point from depth values corresponding to the second 2D coordinates of the key points to obtain fourth 2D coordinates and depth values corresponding to the fourth 2D coordinates;
performing normalization processing on the fourth 2D coordinates and the depth values corresponding to the fourth 2D coordinates to obtain normalized fourth 2D coordinates and depth values corresponding to the normalized fourth 2D coordinates; and
processing the normalized fourth 2D coordinates and the depth values corresponding to the normalized fourth 2D coordinates by using a deep learning module to obtain the 3D posture of the target.

7. The method of claim 6, wherein
performing the normalization processing on the fourth 2D coordinates and the depth values corresponding to the fourth 2D coordinates to obtain the normalized fourth 2D coordinates and the depth values corresponding to the normalized fourth 2D coordinates comprises:
obtaining, based on the fourth 2D coordinates and the depth values corresponding to the fourth 2D coordinates, a mean and a variances of coordinates of the key points; and
obtaining the normalized fourth 2D coordinates according to the mean and the variances as well as the fourth 2D coordinates and the depth values corresponding to the fourth 2D coordinates.

8. The method of claim 1, further comprising:
performing, based on the actual depth values, an iterative operation of projecting the 3D posture to a 2D plane to obtain fifth 2D coordinates having a minimum distance with the third 2D coordinates; and
obtaining a rotation parameter and a translation parameter of the target according to the fifth 2D coordinates and the first 3D features.

9. A non-transitory computer storage medium, having computer executable codes stored thereon, wherein the computer executable codes, when being executed, cause to implement a data processing method, the data processing method comprising:
converting, according to actual depth values of key points of a target in an image and reference depth values, first two-dimensional (2D) coordinates of the key points into second 2D coordinates, the second 2D coordinates and the reference depth values forming first three-dimensional (3D) features of the key points; and
obtaining, based on the first 3D features, a 3D posture of the target,
wherein the data processing method further comprises:
obtaining the first 2D coordinates according to second 3D features of the key points and an optical center position corresponding to the image, the second 3D features comprising: third 2D coordinates obtained based on a 2D image and actual depth values obtained based on a depth image.

10. An electronic device, comprising:
a memory, configured to store information; and
a processor, connected to the memory and configured to implement, by executing computer executable instructions stored on the memory, a data processing method, the data processing method comprising:
converting, according to actual depth values of key points of a target in an image and reference depth values, first two-dimensional (2D) coordinates of the key points into second 2D coordinates, wherein the second 2D coordinates and the reference depth values form first three-dimensional (3D) features of the key points; and
obtaining, based on the first 3D features, a 3D posture of the target,
wherein the processor is further configured to implement:
obtaining the first 2D coordinates according to second 3D features of the key points and an optical center position corresponding to the image, the second 3D features comprising: third 2D coordinates obtained based on a 2D image and actual depth values obtained based on a depth image.

11. The electronic device of claim 10, wherein
converting, according to the actual depth values of the key points of the target in the image and the reference depth values, the first 2D coordinates of the key points into the second 2D coordinates comprises:
obtaining the second 2D coordinates according to the first 2D coordinates and ratios of the actual depth values to the reference depth values.

12. The electronic device of claim 11, wherein
obtaining the second 2D coordinates according to the first 2D coordinates and the ratios of the actual depth values to the reference depth values comprises:
determining the second 2D coordinates by using the following functional relationship:

$$X2=(X1*d)/D$$

$$Y2=(Y1*d)/D$$

where, X2 is a coordinate value of a second 2D coordinate in a first direction, and X1 is a coordinate value of a first 2D coordinate in the first direction;
Y2 is a coordinate value of the second 2D coordinate in a second direction, and Y1 is a coordinate value of the first 2D coordinate in the second direction, the second direction being perpendicular to the first direction; and
d is an actual depth value, and D is a reference depth value.

13. The electronic device of claim 10, wherein
obtaining the first 2D coordinates according to the second 3D features of the key points and the optical center position corresponding to the image comprises:
moving the second 3D features of the key points, such that a 3D feature of a reference point in the key points is translated to the optical center position to obtain third 3D features of the key points; and
projecting the third 3D features to a 2D imaging plane to obtain the first 2D coordinates.

14. The electronic device of claim 13, wherein
if the target is a body skeleton, the 3D feature of the reference point is determined based on second 3D features of two crotch key points in the key points.

15. The electronic device of claim 13, wherein obtaining, based on the first 3D features, the 3D posture of the target comprises:
subtracting a depth value of the reference point from depth values corresponding to the second 2D coordinates of the key points to obtain fourth 2D coordinates and depth values corresponding to the fourth 2D coordinates;

performing normalization processing on the fourth 2D coordinates and the depth values corresponding to the fourth 2D coordinates to obtain normalized fourth 2D coordinates and depth values corresponding to the normalized fourth 2D coordinates; and processing the normalized fourth 2D coordinates and the depth values corresponding to the normalized fourth 2D coordinates by using a deep learning module to obtain the 3D posture of the target.

16. The electronic device of claim 15, wherein performing the normalization processing on the fourth 2D coordinates and the depth values corresponding to the fourth 2D coordinates to obtain the normalized fourth 2D coordinates and the depth values corresponding to the normalized fourth 2D coordinates comprises:

obtaining, based on the fourth 2D coordinates and the depth values corresponding to the fourth 2D coordinates, a mean and a variances of coordinates of the key points; and obtaining the normalized fourth 2D coordinates according to the mean and the variances as well as the fourth 2D coordinates and the depth values corresponding to the fourth 2D coordinates.

17. The electronic device of claim 10, wherein the processor is further configured to implement:

performing, based on the actual depth values, an iterative operation of projecting the 3D posture to a 2D plane to obtain fifth 2D coordinates having a minimum distance with the third 2D coordinates; and obtaining a rotation parameter and a translation parameter of the target according to the fifth 2D coordinates and the first 3D features.

* * * * *